June 22, 1954 P. F. BURCH 2,681,675
HOG SIDE SKINNING MACHINE
Filed Oct. 29, 1951 3 Sheets-Sheet 1

INVENTOR.
Paul F. Burch
BY
ATTORNEY.

INVENTOR.
Paul F. Burch
BY
Otis A. Earl
ATTORNEY.

June 22, 1954 P. F. BURCH 2,681,675
HOG SIDE SKINNING MACHINE
Filed Oct. 29, 1951 3 Sheets-Sheet 3

INVENTOR.
Paul F. Burch
BY
Otis A. Earl
ATTORNEY.

Patented June 22, 1954

2,681,675

UNITED STATES PATENT OFFICE 2,681,675

HOG SIDE SKINNING MACHINE

Paul F. Burch, Rockford, Mich., assignor to Wolverine Shoe and Tanning Corporation, Rockford, Mich.

Application October 29, 1951, Serial No. 253,676

11 Claims. (Cl. 146—130)

This invention relates to improvements in a hog side skinning machine.

The principal objects of this invention are:

First, to provide an improved machine for skinning hog sides in which the hog sides are fed automatically to the skinning drum and knife without requiring the attention of the attendant advancing hog sides to the machine.

Second, to provide a machine in which the leading edge of the hog sides is presented in normal radial relationship to the surface of the skinning drum to effectively engage the holding pins on the drum with the hog side.

Third, to provide a hog side skinning machine having a feed table and skinning knife that are movably mounted with respect to a skinning drum and which are automatically actuated to move the hog side and knife to the most favorable position for engaging the side with the drum and for starting the cut as the drum starts each cycle.

Other objects and advantages relating to details of my invention will be apparent from a consideration of the following description and claims. The drawings, of which there are three sheets, illustrate a highly practical embodiment of my invention.

My invention consists of certain improvements in the machine disclosed and claimed in the copending application of David L. Runnels, Jr., and Paul F. Burch, Serial Number 199,052, filed December 4, 1950, for Machine for Skinning Hog Sides, now Patent No. 2,649,881.

Figure 1:
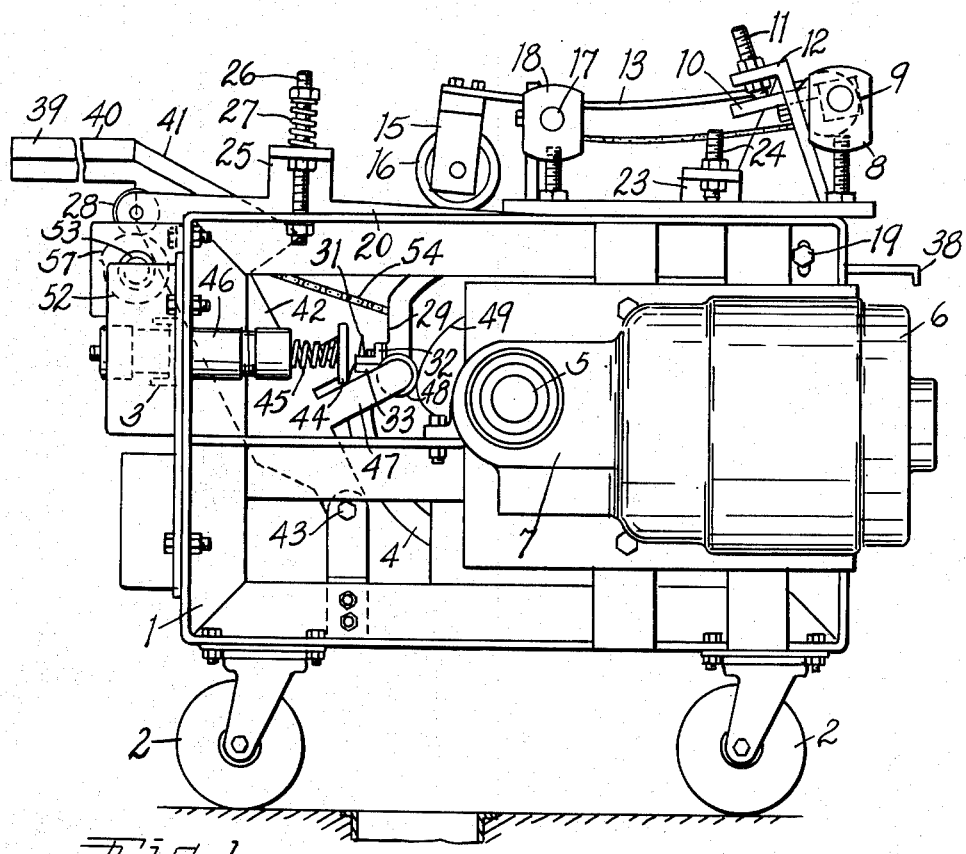
Fig. 1 is a side elevational view of the machine.
Figure 4:
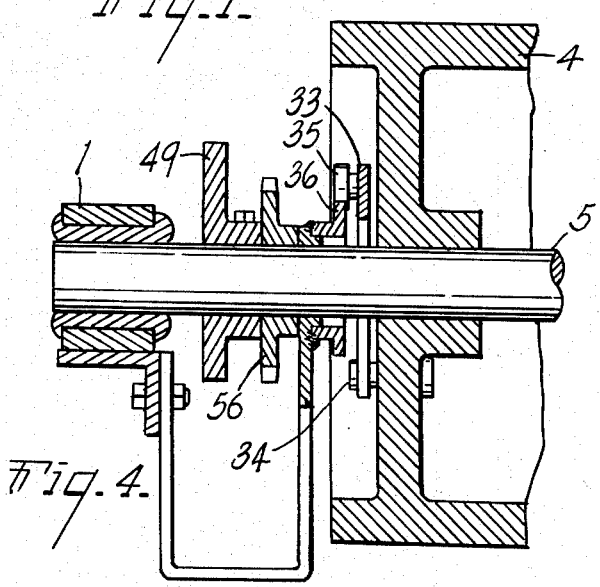
Fig. 4 is an enlarged fragmentary cross sectional view taken along the plane of the line 4—4 in Fig. 3 and illustrating the driving elements for the feed table and knife adjusting mechanism.
Figure 2:
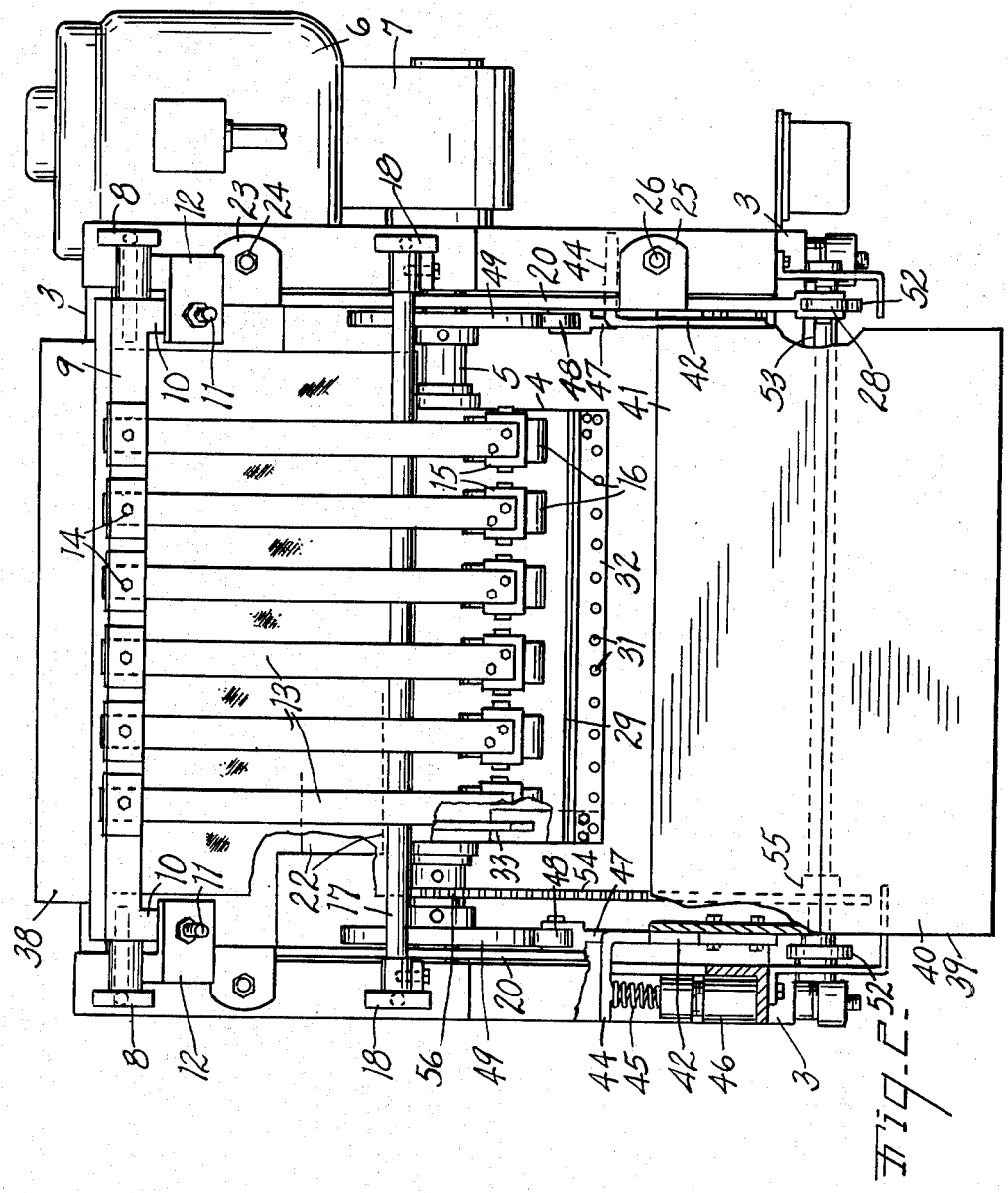
Fig. 2 is a plan view of the machine with portions thereof broken away to illustrate details of construction.
Figure 3:
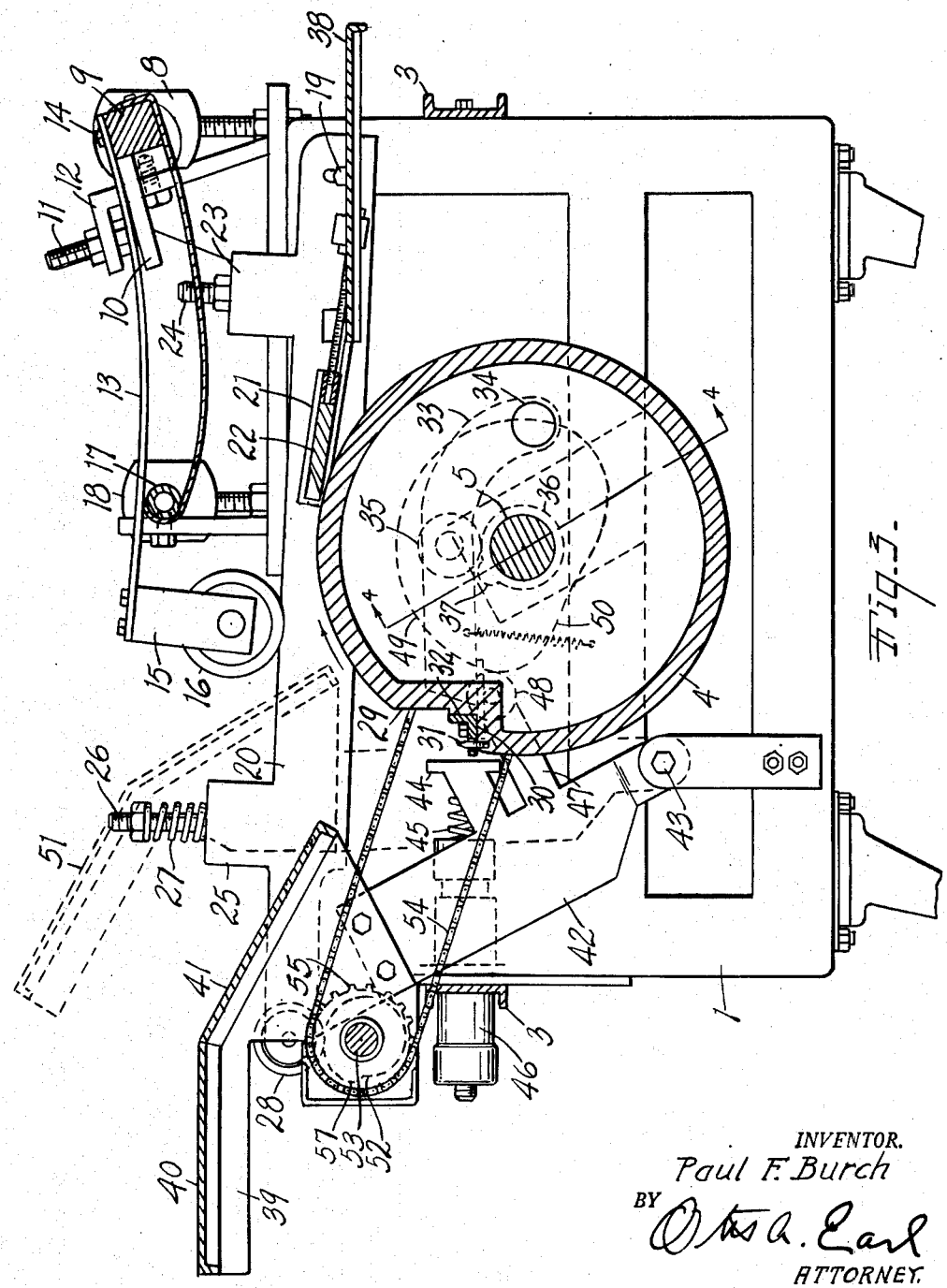
Fig. 3 is an enlarged vertical longitudinal cross sectional view through the machine illustrating the mountings and actuating mechanisms for the feed table and knife.

As is more particularly described and claimed in the foregoing application the hog side skinning machine includes generally a pair of rectangular side frames 1 mounted on wheels 2 and connected by suitable crossbars 3 (see Fig. 3). Mounted transversely of the machine between the side frames 1 is a skinning drum 4 carried by the axle 5. One end frame supports a motor 6 and gearbox 7 for driving the axle and drum in a clockwise direction as indicated in Fig. 3.

Mounted on the front or discharge end of the side frames are upstanding brackets 8 which rotatably support a transversely extending spring support bar 9. Arms projecting rearwardly from the ends of the support bar 9, as at 10, are engaged by screws 11 supported in the brackets 12 for adjusting the rotated position of the bar 9. A plurality of leaf springs 13 have their forward ends rigidly secured to the support bar as at 14. The rear ends of the springs 13 are provided with downwardly extending yokes 15 in which pressure rolls 16 are rotatably mounted in spaced relationship above the skinning drum and slightly rearwardly from the transverse centerline thereof. A transversely extending support bar 17 carried by uprights 18 on the side frames extends underneath the springs 13 and is vertically adjustable to vary the elevation and tension of the leaf springs.

Extending longitudinally along the inside of each side frame and pivoted to the forward edge thereof, as at 19, is a knife support bar 20. Each bar 20 has a guide slot 21 on its inner surface (see Fig. 3) arranged to receive the end of a skinning knife 22 which is thus supported by and extends transversely between the support bars 20. An upstanding angle-shaped bracket 23 toward the forward end of each support bar overlies the side frame and carries an adjusting screw 24 which engages the side frame to limit downward motion of the support bar and knife with respect to the skinning drum. Toward their rear ends each support bar 20 is provided with a second upstanding angle-shaped bracket 25 which also overlies the side frame member and passes a guide bolt 26 having a spring 27 positioned around the upper end thereof. The spring adjustably bears against the bracket 25 to urge the support bar 20 and knife 22 downwardly. The extreme rear end of each support bar 20 is bifurcated and carries a follower roll 28 for a purpose to be described presently.

The periphery of the skinning drum 4 is provided with a transversely extending notch of substantial depth, as at 29, and the radially extending rear face 30 of the notch carries a plurality of tangentially projecting pins 31. As in the above mentioned copending application, an angle-shaped stripper bar 32 overlies the face 30 with the pins 31 projecting through the stripper bar. Rocker arms 33 secured to each end of the stripper bar and pivoted to the ends of the drum at 34 rotate with the drum. Cam followers 35 carried by the rocker arms are rotated around a fixed cam 36 by rotation of the drum. As the drum completes each rotation the follower rolls 35 are brought into engagement with the cam lifts 37 to elevate the rocker arms and stripper bar ahead of the pins 31 and strip the defatted skin from the pins. Upon being released from the pins, the skin falls by gravity from the bottom of the machine. It will be appreciated that at the start of the cycle of the machine each hog side is drawn by the pins 31 underneath the pressure rolls 16 and against the cutting knife 22 to shave the layer of fat from the outer skin, which is presented in downwardly facing relationship to the surface of the drum. The separated layer of fat is discharged from the front of the machine across a table 38.

In order to feed the incoming hog sides to the drum 4 in properly positioned relationship with respect to the pins 31, I have provided a tiltable feed table 39 having a flat rear portion 40 and a forwardly inclined chute portion 41. The table extends transversely between the side frames and is supported at its ends by arms 42 that extend downwardly and forwardly to pivots 43 near the bottoms of the side frames. Outwardly projecting brackets 44 on the arms 42 form abutments for springs 45 mounted in housings 46 on the side frames. The springs 45 thus constantly urge the table 39 forwardly and upwardly about the pivots 43. Lower brackets 47 on each of the table supporting arms 42 carry follower rolls 48 that engage and roll upon cams 49 that rotate with the axle 5. The cams 49 are of radially extended contour through over half their circumference but retract sharply radially as at 50 (see Fig. 3) to permit the springs 45 to force the table 39 forwardly, as the drum rotates, to advance the pins 31 to the pressure rolls 16. Thus the feed table assumes the position indicated by the dotted lines at 51 in Fig. 3 and a hog side positioned on the table will be thrown forwardly and downwardly between the table and the pressure rolls and into the notch 29 in the skinning drum. In this position the pins 31 will be normal to the leading edge of the hog hide and will firmly and securely penetrate the skin on the hog side to assure positive engagement between the hog side and the skinning drum. After the pins have engaged the hog side, continued rotation of the drum brings the radially extended portion of the cam 49 into engagement with the follower rolls 48 and forces the table 39 back to its full line position where an attendant can easily place a second hog side on the table. It is thus possible for the attendant to perform final meat cutting operations on the hog side and simply slide it over the flat portion 40 of the table without taking particular pains to engage the hog side with the pins as the drum rotates.

The knife support bars 26 are oscillated in timed relationship with the rotation of the drum to raise the knife 22 away from the drum at the beginning of each skinning operation. This oscillating motion is accomplished by means of cams 52 that are rotatably mounted on a cross shaft 53 at the rear end of the table. The cams 52 are positioned under and coact with the previously described follower rolls 28 on the rear ends of the knife support bars. The shaft 53 is driven in timed relationship with the drum 4 by means of a chain 54 trained around sprockets 55 and 56 on the shaft 53 and axle 5, respectively. The cams 52 have sharply receding lift portions 57 that raise the knife support bars and knife at the end of each skinning operation and during the initial engagement of the knife with the incoming hog side. After the knife has made a clean entry into the leading edge of the hog side, the lifts 57 quickly return the support arms and knife into closely spaced relationship to the surface of the drum so that the knife closely shaves the skin from the fat of the hog side. It should be noted that the thickened rib of fat thus left along the leading edge of each skin is stripped from the pins 31 by the stripper bar 32 and acts as a weight to peel the following portion of the skin from the drum.

I have thus described the essential features of my machine so that they can be incorporated into skinning machines having a wide variety of modifications in their frameworks and other details.

Having thus described my invention, what I claim as new and desire to secure by Letters Patent is:

1. In combination with a hog side skinning machine having a rotatable skinning drum with a longitudinally extending notch in the periphery thereof and hog side impaling pins with a stripper bar thereover positioned along said notch, a feed table positioned along the rear end of said machine and extending transversely thereof behind said drum, arms pivotally supporting said table on said machine from points positioned below the center of said drum and forwardly of the retracted position of said table, said table having a flat rear portion and a downwardly inclined front portion that are swingable with said arms to move said inclined portion into sharply inclined generally radial relationship over the surface of said drum, spring means bearing against said arms and biasing said table toward advanced tilted position, cams at each end of said drum and rotatable therewith and engageable with said arms in opposition to said spring means, said cams having extended lift portions holding said table retracted except when the notch in said drum approaches and passes the tilted position of said table, knife support bars extending longitudinally along the sides of said machine and pivotally connected thereto at their forward ends, a skinning knife adjustably carried by said support bars and extending transversely of the machine and longitudinally along the surface of said drum, a cam shaft extending transversely of the machine and having cams thereon engageable with the rear ends of said support bars to raise said arms and said knife, and means for driving said cam shaft in timed relationship with said drum whereby the cams on the cam shaft lift said knife while the slot in said drum is approaching and passing said knife.

2. In combination with a hog side skinning machine having a rotatable skinning drum with a longitudinally extending notch in the periphery thereof and hog side impaling pins positioned along said notch, a feed table positioned along the rear end of said machine and extending transversely thereof behind said drum, arms pivotally supporting said table on said machine from points positioned below the center of said drum and forwardly of the retracted position of said table, said table having a flat rear portion and a downwardly inclined front portion that are swingable with said arms to move said inclined portion into sharply inclined generally radial relationship over the surface of said drum, spring means bearing against said arms and biasing said table toward advanced tilted position, cams at each end of said drum and rotatable therewith and engageable with said arms in opposition to said spring means, said cams having extended lift portions holding said table retracted except when the notch in said drum approaches and passes the tilted position of said table, knife support bars extending longitudinally along the sides of said machine and pivotally connected thereto at their forward ends, a skinning knife adjustably carried by said support bars and extending transversely of the machine and longitudinally along the surface of said drum, a cam shaft extending transversely of the machine and having cams thereon engageable with the rear ends of said support bars to raise said arms and said knife, and means for driving said cam shaft in timed relationship with said drum whereby the cams on the cam shaft lift said knife while the slot in said drum is approaching said knife.

3. In combination with a hog side skinning machine having a rotatable skinning drum with a longitudinally extending notch in the periphery thereof and hog side impaling pins positioned along said notch, a feed table positioned along the rear end of said machine and extending transversely thereof behind said drum, arms pivotally supporting said table on said machine from points positioned below the center of said drum and forwardly of the retracted position of said table, said table being swingable with said arms to move into sharply inclined generally radial relationship over the surface of said drum, spring means bearing against said arms and biasing said table toward advanced tilted position, cams at each end of said drum and rotatable therewith and engageable with said arms in opposition to said spring means, said cams having retracted portions permitting said table to tilt when the notch in said drum approaches the tilted position of said table, knife support bars extending longitudinally along the sides of said machine and pivotally connected thereto at their forward ends, a skinning knife adjustably carried by said support bars and extending transversely of the machine and longitudinally along the surface of said drum, a cam shaft extending transversely of the machine and having cams thereon engageable with the rear ends of said support bars to raise said arms and said knife, and means for driving said cam shaft in timed relationship with said drum whereby the cams on the cam shaft lift said knife while the slot in said drum is approaching said knife.

4. In combination with a hog side skinning machine having a rotatable skinning drum with a longitudinally extending notch in the periphery thereof and hog side impaling pins positioned along said notch, a feed table positioned along the rear end of said machine and extending transversely thereof behind said drum, arms pivotally supporting said table on said machine from points positioned below and forwardly of the retracted position of said table, said table being swingable with said arms to move into sharply inclined relationship over the surface of said drum, spring means biasing said table toward advanced tilted position, cams at each end of said drum and rotatable therewith and engageable with said arms in opposition to said spring means, said cams having retracted portions permitting said table to tilt when the notch in said drum approaches the tilted position of said table, knife support bars extending longitudinally along the sides of said machine and pivotally connected thereto at their forward ends, a skinning knife adjustably carried by said support bars and extending transversely of the machine and longitudinally along the surface of said drum, a cam shaft extending transversely of the machine and having cams thereon engageable with said support bars to raise said arms and said knife, and means for driving said cam shaft in timed relationship with said drum whereby the cams on the cam shaft lift said knife while the slot in said drum is approaching said knife.

5. In combination with a hog side skinning machine having a rotatable skinning drum with a longitudinally extending notch in the periphery thereof and hog side impaling pins with a stripper bar thereover positioned along said notch, a feed table positioned along the rear end of said machine and extending transversely thereof behind said drum, arms pivotally supporting said table on said machine from points positioned below the center of said drum and forwardly of the retracted position of said table, said table having a flat rear portion and a downwardly inclined front portion that are swingable with said arms to move said inclined portion into sharply inclined generally radial relationship over the surface of said drum, spring means bearing against said arms and biasing said table toward advanced tilted position, cams at each end of said drum and rotatable therewith and engageable with said arms in opposition to said spring means, said cams having retracted portions permitting said table to tilt when the notch in said drum approaches the tilted position of said table, and a skinning knife extending transversely of the machine and longitudinally along the surface of said drum forwardly of the tilted position of said table.

6. In combination with a hog side skinning machine having a rotatable skinning drum with a longitudinally extending notch in the periphery thereof and hog side impaling pins positioned along said notch, a feed table positioned along the rear end of said machine and extending transversely thereof behind said drum, arms pivotally supporting said table on said machine from points positioned below and forwardly of the retracted position of said table, said table being swingable with said arms to move into sharply inclined relationship over the surface of said drum, spring means biasing said table toward advanced tilted position, cams at each end of said drum and rotatable therewith and engageable with said arms in opposition to said spring means, said cams having retracted portions permitting said table to tilt when the notch in said drum approaches the tilted position of said table, and a skinning knife extending transversely of the machine and longitudinally along the surface of said drum forwardly of the tilted position of said table.

7. In combination with a hog side skinning machine having a rotatable skinning drum with a longitudinally extending notch in the surface thereof and hog side impaling pins on a forwardly facing radial surface of the notch, a feed table for supporting and advancing hog sides to said drum and said pins comprising a flat portion disposed rearwardly of said drum and an inclined portion extending downwardly and forwardly toward said drum, means swingably supporting said table and permitting the same to be translated forwardly and tilted downwardly from its retracted position until the front edge of said inclined portion is positioned in closely adjacent generally radially extending relationship to the surface of said drum, and means actuated in timed relationship with rotation of said drum for swingably advancing said table as the notch in said drum approaches and passes the inclined position of said table.

8. In combination with a hog side skinning machine having a rotatable skinning drum with a longitudinally extending notch in the surface thereof and hog side impaling pins on a forwardly facing surface of the notch, a feed table for supporting and advancing hog sides to said drum and said pins comprising a flat portion disposed rearwardly of said drum and an inclined portion extending downwardly and forwardly toward said drum, means swingably supporting said table and permitting the same to be translated forwardly and tilted downwardly from its retracted position until the front edge of said inclined portion is positioned in closely adjacent sharply tilted relationship to the surface of said drum, and means actuated in timed relationship with rotation of said drum for swingably advancing said table as the notch in said drum approaches and passes the inclined position of said table.

9. In combination with a hog side skinning machine having a rotatable skinning drum with a longitudinally extending notch in the surface thereof and hog side impaling pins on a forwardly facing surface of the notch, a feed table for supporting and advancing hog sides to said drum and said pins, means swingably supporting said table and permitting the same to be translated forwardly and tilted downwardly from its retracted position until the front edge of the table is positioned closely adjacent to the surface of said drum, and means actuated in timed relationship with rotation of said drum for swingably advancing said table as the notch in said drum approaches the inclined position of said table.

10. In combination with a hog side skinning machine having a rotatable skinning drum with hog side gripping means disposed in a longitudinal line on the surface of the drum, a feed table for supporting and advancing hog sides to said drum and said gripping means comprising a flat portion disposed rearwardly of said drum and an inclined portion extending downwardly and forwardly toward said drum, means swingably supporting said table and permitting the same to be translated forwardly and tilted downwardly from its retracted position until the front edge of said inclined portion is positioned closely adjacent to the surface of said drum, and means actuated in timed relationship with said drum for swingably advancing said table as the gripping means on said drum approaches the inclined position of said table.

11. In combination with a hog side skinning machine having a rotatable skinning drum with hog side gripping means disposed in a longitudinal line on the surface of the drum, a feed table for supporting and advancing hog sides to said drum and said gripping means, means swingably supporting said table and permitting the same to be translated forwardly and tilted downwardly from its retracted position until the front edge of the table is positioned closely adjacent to the surface of said drum, and means actuated in timed relationship with said drum for swingably advancing said table as the gripping means on said drum approaches the inclined position of said table.

References Cited in the file of this patent

UNITED STATES PATENTS

| Number | Name | Date |
| --- | --- | --- |
| 782,992 | Schmidt et al. | Feb. 21, 1905 |
| 1,259,213 | Crawford | Mar. 12, 1918 |
| 1,790,592 | Morrison | Jan. 27, 1931 |
| 2,215,114 | Baader et al. | Sept. 17, 1940 |
| 2,299,866 | Willard | Oct. 27, 1942 |
| 2,539,692 | Hickman et al. | Jan. 30, 1951 |
| 2,590,747 | Birdseye | Mar. 25, 1952 |
| 2,649,881 | Runnells et al. | Aug. 25, 1953 |